Figure 1:
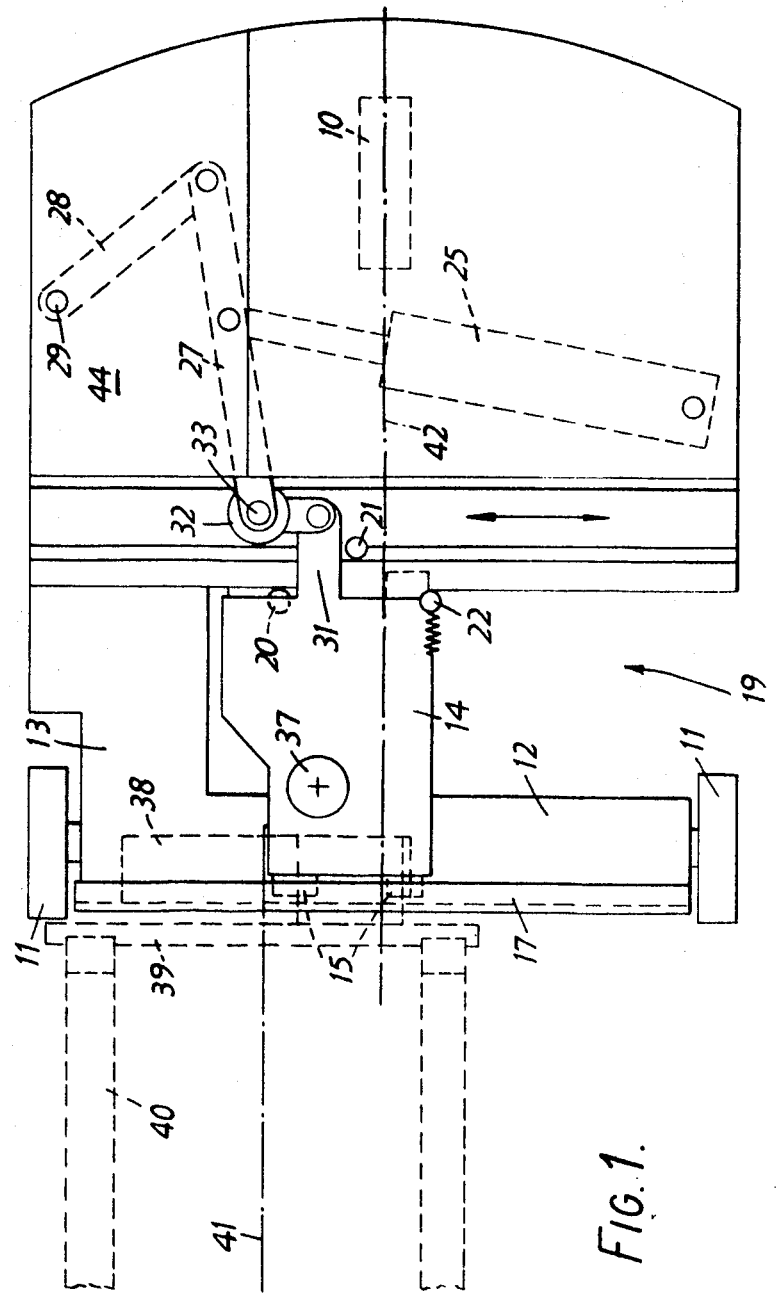

United States Patent

[11] 3,583,587

| [72] | Inventor | Leonard Stanley Mathew<br>Sutton Place Farm, Abinger Hammer, nr. Dorking, Surrey, England |
|---|---|---|
| [21] | Appl. No. | 800,631 |
| [22] | Filed | Feb. 19, 1969 |
| [45] | Patented | June 8, 1971 |
| [32] | Priority | Feb. 19, 1968 |
| [33] | | Great Britain |
| [31] | | 8080/68 |

[54] FORKLIFT TRUCKS
4 Claims, 2 Drawing Figs.

[52] U.S. Cl. .................................................. 214/671, 214/670
[51] Int. Cl. ...................................................... B66f 9/14
[50] Field of Search ........................................... 214/670, 671, 672, 660

[56] References Cited
UNITED STATES PATENTS

| 2,393,902 | 1/1946 | Hastings, Jr. ............... | 214/671 |
| 3,212,654 | 10/1965 | Dolphin ...................... | 214/671 X |
| 3,231,109 | 1/1966 | Bengel et al. ............... | 214/670 X |
| 3,313,436 | 4/1967 | Mathew et al. ............. | 214/672 |
| 3,432,054 | 3/1969 | Ulinski ....................... | 214/670 |
| 3,445,019 | 5/1969 | Steinert ...................... | 214/671 |

FOREIGN PATENTS

| 1,035,569 | 7/1958 | Germany ..................... | 214/670 |
| 1,037,368 | 8/1958 | Germany ..................... | 214/670 |
| 1,063,968 | 8/1959 | Germany ..................... | 214/670 |
| 855,589 | 12/1960 | Great Britain ............... | 214/671 |
| 990,992 | 5/1965 | Great Britain ............... | 214/670 |

Primary Examiner—Gerald M. Forlenza
Attorney—Wenderoth, Lind & Ponack

ABSTRACT: A forklift truck has a chassis which has a front axle beam and a slot behind the beam which slot opens to one side of the truck, and an extensible mast structure supporting a load fork. The mast structure is mounted on a carriage which is supported on mountings on the chassis at both the front and rear sides of the slot and which is traversible along the slot on these mountings. The mast structure can be swiveled on the carriage into a forwardly facing position, and into a laterally facing position in which the load fork straddles the front axle beam. Traversing movement of the carriage enables the fork to be projected beyond the side of the truck and to be withdrawn substantially completely into the slot.

LEONARD STANLEY MATHEW, Inventor

LEONARD STANLEY MATHEW, Inventor

By Wenderoth, Lind & Ponack Attorneys

FORKLIFT TRUCKS

This invention relates to forklift trucks and more particularly to forklift trucks in which the carrier frame for supporting the load fork can be swung into forwardly facing and sideways facing positions.

According to this invention there is provided a forklift truck having a wheeled chassis including a front axle beam with a transversely extending slot behind said beam which slot opens to one side of the truck, a carriage mounted for traversing movement along the slot, a mast structure mounted on the carriage and carrying a carrier frame which is movable up and down the mast structure into and out of a position close the ground, mans for swinging the mast structure and carrier frame about a vertical axis into a first position in which the carrier frame faces forwardly and a second position in which the frame faces sideways of the truck, the frame being adapted, when in said sideways facing position and close to the ground, to straddle the front axle beam, means for moving the carriage along the slot and adapted, when the carrier frame is in said sideways facing position and carries a load fork, for moving the carriage into a retracted position in which the fork is fully drawn into the slot so as not to project beyond or substantially beyond the side of the chassis and into an extended position in which the fork projects beyond the side of the chassis, and mounting means on the chassis for the carriage at both the fore and aft sides of the slot. That centerline of the mast structure and carrier frame which extends in a fore and aft direction when the carrier frame faces forwardly may be disposed forwardly of or over but is preferably behind the common axis of rotation of the front wheels of the truck when the carrier frame is in said sideways facing position.

According to a preferred feature of the invention, resilient means is provided taking up any backlash which would tend to permit the carriage to slew about a vertical axis on said mountings.

According to another preferred feature of the invention, said vertical axis is offset from said centerline of the mast structure such that when the mast structure is in said second position said vertical axis is rearward of said centerline.

Figure 2:
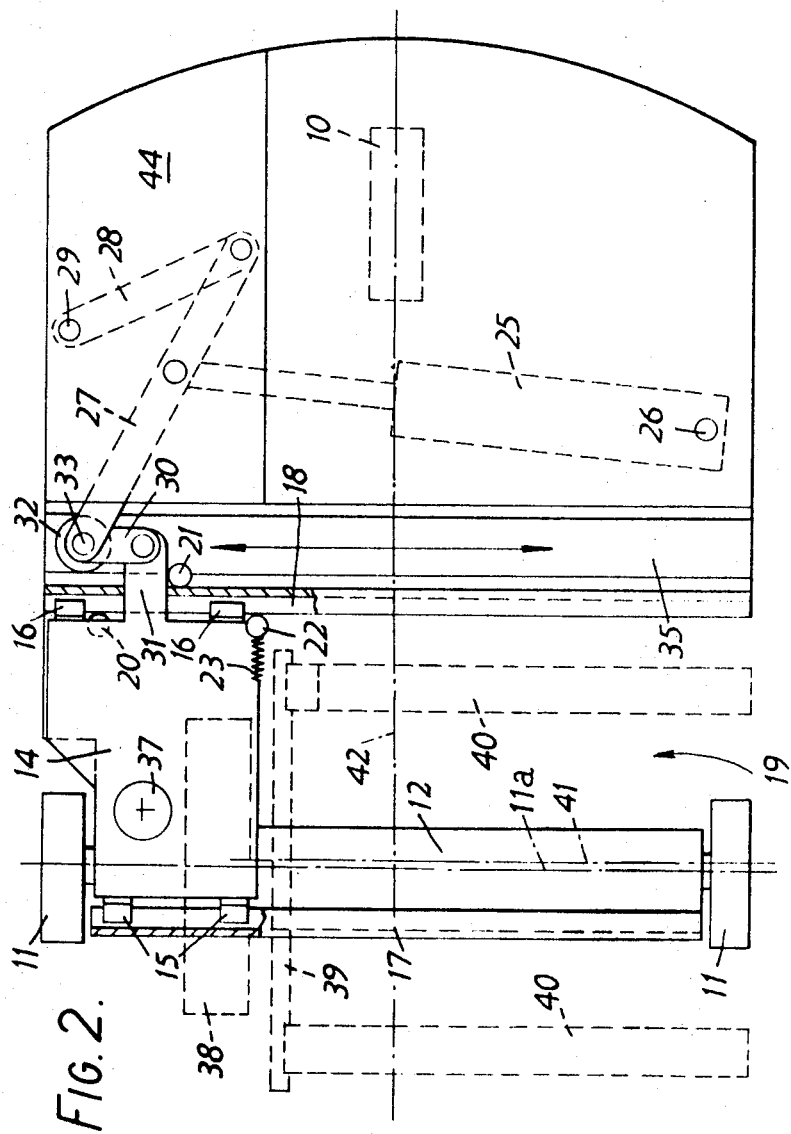

One embodiment of the invention will now be described by way of example with reference to the accompanying diagrammatic drawings, in which:

FIG. 1 is a plan view of a forklift truck according to the invention having its carrier frame and carrier fork in a forwardly facing position, and FIG. 2 is a similar view to FIG. 1 but shows the carrier frame and load fork in a sideways facing position.

Referring to the drawings, the truck has a steerable rear wheel 10 coupled to be driven by the engine (not shown) of the vehicle and has two nonsteerable front wheels 11. The front wheels 11 are mounted on a rigid front axle beam 12 which forms part of the chassis of the truck and which is connected by a rigid chassis portion 13 to the rearward main part of the chassis. A carriage 14 is traversible across substantially the full width of the truck and is supported for this purpose on two front bearings 15 and two rear bearings 16 which are mounted on the carriage. Bearings 15 are in rolling engagement with the bottom side flange of a transversely extending channel member 17 secured to the axle beam 12, and bearings 16 are in similar rolling engagement with the bottom side flange of a channel section member 18 secured to the rearward main part of the chassis at the rearward side of the slot 19 which is formed between the axle beam 12 and the rearward main portion of the chassis. The carriage is restrained by rollers 20 to 22 against forces tending to twist it about a vertical axis. Rollers 20 and 22 run on the edge of one side flange of the channel member 18 and roller 21 runs on the rear face of the base portion of the member 18. Roller 22 is loaded into engagement with the member 18 by a compression spring 23 to prevent the occurrence of backlash between rollers 20 to 22 and the member 18.

The means for traversing the carriage 14 across the width of the truck in the illustrated construction comprises a ram 25 which has one end pivotally connected to the chassis at 26 and has its other end pivotally connected to a lever 27. A link 28 is pivotally connected between an anchorage 29 on the chassis of the truck and one end of lever 27, and a second link 30 is pivotally connected between the other end of lever 27 and a rearwardly projecting lug 31 of the carriage 14. A roller 32 is mounted on the pin 33 which forms the pivot connection between link 30 and lever 27 and this roller engages one sidewall of a transversely extending upwardly facing channel section beam 35 which forms part of the chassis of the truck. Roller 32 thus prevents any thrust in a fore and aft direction from being transmitted from the lever 27 to the carriage 14 during traversing movement of the carriage.

A vertical pivot post 37 is fixedly mounted on the carriage 14 and provides a pivot for a conventional mast structure 38 including a carrier frame 39 which supports a load fork 40. The mast structure 38 is indicated only in chain lines in the drawings for reasons of clarity, but is of the kind comprising a first guide frame which is fixed against movement in an up-and-down direction, and a moving guide frame which is movable up and down the fixed guide frame, the carrier frame being in turn movable up and down the moving guide frame. The carrier frame is supported by chains (not shown) which extend over sprockets mounted at the upper end of the moving guide frame and the opposite ends of which are anchored to the fixed guide frame. A hydraulic ram (not shown) is pivotally connected between the lower end of the fixed guide frame and the upper end of the moving guide frame. Thus when the ram is extended, the moving guide frame is moved up the fixed guide frame, and at the same time the carrier frame moves up the moving guide frame, so that the speed of movement of the carrier frame is twice that of the moving guide frame. The lower end of the fixed guide frame terminates above the level of the axle beam 12 so as not to interfere with the swiveling movement of the mast structure about post 37. Means (not shown) is also provided for enabling the fixed guide frame to be tilted rearwards in known manner.

As will be clear from FIG. 1, that centerline 41 of the mast structure 38 and load fork 40 which extends in a fore and aft direction when the carrier frame faces forwardly, is laterally offset from the axis of the pivot post 37 for the mast structure. This assists in enabling the load fork 40 to be movable to the same extent on both sides of the longitudinal centerline 42 of the truck without making the dimensions of the carriage 14 lengthwise of the slot 19 so short as to reduce the distance between the rollers 15 and the distance between the rollers 16 sufficiently to affect the stability of the carriage 14 adversely under load.

It will also be seen from FIG. 2 that the centerline 41 of the carrier fork 40 is rearward of the common axis 11a of the front wheels 11 when the load fork and mast structure are slewed into a sideways facing position. Thus, when the load fork 40 carries a load and is in the sideways facing position, there will be normally no moment tending to overturn the truck about the common axis of the front wheels 11.

The load fork and mast structure 38 can be traversed from side to side of the truck when the load fork is in the position shown in FIG. 1 and the load fork can be lowered and raised along the mast structure into and out of a position close to the ground. When the load fork is raised clear of the wheels 11 and axle beam 12, the mast structure and load fork can be slewed about the pivot post 37 to bring the load fork into a sideways facing position, and the carriage 14 can be traversed if necessary to bring the tips of the load fork generally in line with the side of the truck as shown in FIG. 2. The body of the truck is relatively low in height over the major part of the width of the truck so that a long load can be carried when the fork is in the sideways facing position. The part 44 of the body behind the chassis portion 13 is raised and carries the operating controls and a seat for the driver.

In the sideways facing position, the load fork 40 straddles the front axle beam 12, as shown, and the carrier frame 39 is notched centrally or otherwise constructed to enable the fork to be lowered close to the ground when the load fork is in a sideways facing position. By traversing the carriage 14, the load fork 40 can be made to project beyond the side of the truck to enable the fork to be loaded and unloaded in the sideways facing position if desired.

In an alternative construction, ram 26, lever 27 and links 28 and 30 are replaced by a pinion mounted on carriage 14 and meshing with a fixed rack extending transversely of the truck. The pinion is driven by a reversible motor for traversing the carriage to and fro along the slot.

I claim:

1. A forklift truck comprising a wheeled chassis including a front axle beam with a transversely extending slot behind said beam which slot opens to one side of the truck and a member which extends transversely of the chassis at the rearward side of the slot, said axle beam and said member respectively providing guideways extending parallel to each other transversely of the chassis, a carriage mounted for traversing movement along the two guideways, a mast structure mounted on the carriage and carrying a carrier frame which is movable up and down the mast structure into and out of a position close to the ground, means for swinging the mast structure and carrier frame about a vertical axis into a first position in which the carrier frame faces forwardly and a second position in which the frame faces sideways of the truck, the frame being adapted, when in sideways facing position and close to the ground, to straddle the front axle beam, means for moving the carriage along the slot and adapted, when the carrier frame is in said sideway facing position and carries a load fork, for moving the carriage into a retracted position in which the fork is fully drawn into the slot so as not to project beyond or substantially beyond the side of the chassis and into an extended position in which the fork projects beyond the side of the chassis, said vertical axis being offset from the fore and aft extending centerline of the mast structure, when the mast structure is in said first position, in a direction towards said one side of the truck.

2. A forklift truck as claimed in claim 6, wherein resilient means is provided taking up any backlash which would tend to permit the carriage to slew about a vertical axis on said mountings.

3. A forklift truck as claimed in claim 2, wherein the mounting means includes a fixed member disposed at one side of the slot and extending along the length of the slot, and three rollers or sliders mounted on the carriage and spaced-apart lengthwise of the fixed member, the fixed member having forwardly facing and rearwardly facing sides one of which is engaged by one of the rollers or sliders and the other of which is engaged by the other two rollers or sliders, and wherein the resilient means for taking up said backlash comprises spring means pressing one of the rollers or sliders into engagement with the fixed member.

4. A forklift truck as claimed in claim 1 wherein that centerline of the mast structure which extends in a fore and aft direction when the carrier frame faces forwardly, is disposed behind the common axis of rotation of the front wheels of the truck when the carrier frame is in said sideways facing position.